United States Patent [19]
Cohen

[11] 3,920,749
[45] Nov. 18, 1975

[54] PROCESS FOR DEHYDRATING VINYL-SUBSTITUTED TERTIARY ALCOHOLS

[75] Inventor: Noal Cohen, Montclair, N.J.

[73] Assignee: Hoffmann-La Roche Inc., Nutley, N.J.

[22] Filed: Aug. 17, 1973

[21] Appl. No.: 389,310

[52] U.S. Cl............ 260/586 R; 260/338; 260/340.3; 260/340.5; 260/469; 260/471 R; 260/478; 260/487; 260/488 B; 260/488 CD; 260/586 E; 260/586 F; 260/590
[51] Int. Cl.$^2$...................... C07C 1/24; C07C 45/00
[58] Field of Search............. 260/586 R, 590, 340.3, 260/340.5, 338

[56] References Cited
OTHER PUBLICATIONS
Barrett et al., "J. Am. Chem. Soc.," Vol. 89, pp. 5665–5667, 1967.
Heymann et al., "J. Am. Chem. Soc.," Vol. 73, pp. 5252–5265, 1951.

*Primary Examiner*—Norman P. Morgenstern
*Attorney, Agent, or Firm*—Samuel L. Welt; Jon S. Saxe; George M. Gould

[57] ABSTRACT

Selective dehydration of 1$\beta$-hydroxy-9$\beta$-methyl-1-vinyl-perhydro-naphthalen-6-one using Lewis acids such as boron trifluoride etherate produces 9,10-trans-9$\beta$-methyl-1-vinyl-3,4,5,6,7,8,9,10-octahydronaphthalen-6-one. By introducing a 2,6-lower alkylbenzoquinone into the above reaction medium, it is possible to obtain directly tetracyclic steroidal intermediates.

4 Claims, No Drawings

PROCESS FOR DEHYDRATING VINYL-SUBSTITUTED TERTIARY ALCOHOLS

BACKGROUND OF THE INVENTION

In U.S. Pat. application Ser. No. 261,853, filed June 12, 1972, inventor Dr. Z. Valenta, there is disclosed a steroid total synthesis wherein a key step is the reaction of a 2,6 lower alkylbenzoquinone with a 9β-methyl-1-vinyl-hexa- or octahydro-naphthalen-6-one compound to produce 14β-17-methyl-D-homo-androst-9(11),16-dien-3,15,17a-triones. The starting materials 9β-methyl-1-vinyl hexa- or octahydro-naphthalen-6-one for the said reaction is in turn prepared by the dehydration of 1β-hydroxy-9β-methyl-1-vinyl-octa- or perhydronaphthalen-6-one utilizing potassium bisulfite and pyrogallol at elevated temperatures. This procedure produces the desired product in only moderate yield at best and the product is in semi-crystalline form and thus difficult to purify. It is evident that in a multi-step steroid synthesis it is necessary that all steps be of highest possible yield with products of highest purity in order for the process to have any commercial viability.

The aforesaid dehydration process is not amenable to improvement by using alternative conventional dehydration reagents. Thus, use of sulfonic acids such as p-toluene sulfonic acid/refluxing benzene produces mostly a rearranged material. With systems such as oxalic acid/refluxing benzene 2,4-dinitrophenol/refluxing benzene and trichloroacetic acid/refluxing benzene starting material is recovered. Use of thionyl chloride results in allylic rearrangement of the vinyl alcohol system.

DESCRIPTION OF THE INVENTION

The present invention relates to an improved process for the dehydration of a compound of the formula

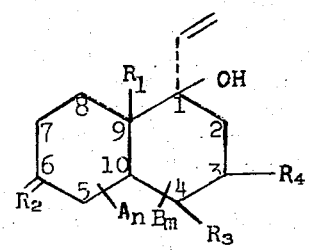

I wherein $R_1$ is $C_{1-4}$ lower alkyl; $R_2$ is oxo, $C_{1-5}$ lower alkylenedioxy, $C_{6-12}$ arylenedioxy, H,H or H,$R_5$, where $R_5$ is $C_{1-7}$ lower alkoxy, $C_{7-12}$ aryl lower alkoxy or $C_{1-12}$ acyl; $R_3$ and $R_4$ are independently selected from the group consisting of hydrogen or $C_{1-7}$ lower alkyl; A is an additional carbon-carbon bond between positions 4 and 5; B is an additional carbon-carbon bond between positions 5 and 6; $m$ and $n$ are 0 or 1 with the proviso that if either is 1 then the other is 0, so as to produce a compound of the formula

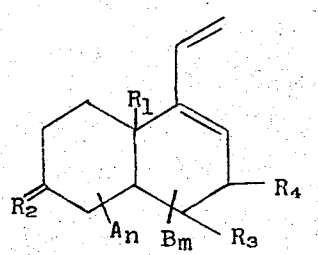

II wherein $R_1$, $R_2$, $R_3$, $R_4$, A, B, $m$, and $n$ are as above.

The process of this invention utilizes a Lewis acid as dehydrating agent. Suitable Lewis acids for this purpose include boron trifluoride, aluminum chloride, aluminum bromide, etc. A preferred Lewis acid is boron trifluoride, most preferably in the form of its ethyl ether complex.

The dehydration can be carried out in an inert organic solvent medium such as, for example, an aromatic hydrocarbon such as benzene, toluene, xylene, etc., a halogenated alkyl such as carbon tetrachloride, chloroform or dichloroethane. In order to minimize side reactions, it is most desirable to include a cyclic ether such as tetrahydrofuran in the reaction medium. A temperature of from about 60°C to the reflux temperature of the reaction medium, preferably from about 80°C to reflux, may be employed in the process of the invention.

In a further aspect of the present invention, a compound of formula I above is dehydrated using the conditions described above but in the presence of a 2,6-lower alkyl benzoquinone of the formula

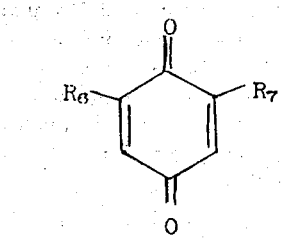

III wherein $R_6$ and $R_7$ both independently are $C_{1-4}$ lower alkyl so as to directly produce in one step a steroidal intermediate of the formula

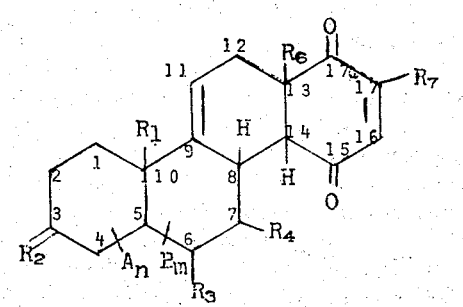

IV wherein $R_1$, $R_2$, $R_3$, $R_4$, $R_6$, $R_7$, A, B, $m$ and $n$ are as above.

As used herein, the term "lower alkyl" is meant to include straight or branched chain saturated hydrocarbon radicals such as methyl, ethyl, i-propyl, n-butyl and the like. The term "lower alkoxy" is meant to include a $C_{1-7}$ lower alkyl oxy radical having its valence bond from the ethereal oxygen atom. The term "aryl" is meant to include monocyclic aromatic hydrocarbons which may be substituted on the ring with one or two $C_{1-7}$ lower alkyl groups. Phenyl represents a preferred aryl group. "Aryl lower alkoxy" is meant to include groups such as phenyl $C_{1-4}$ lower alkoxy, preferably benzyloxy. Suitable acyloxy groups are derived from alkanoic or benzoic (which may be further substituted by $C_{1-7}$ lower alkyl, nitro or halo) acids, commonly used to esterify steroidal hydroxy moieties including, for example, acetoxy, propionoxy, benzoyloxy and the like. Examples of arylalkyl groups useful herein include phenyl $C_{1-4}$ lower alkyl groups such as benzyl and phenethyl. Suitable "lower alkylenedioxy" and "arylenedioxy" groups include those commonly used as a protective ketal group in steroid chemistry, such as, for example, ethylenedioxy, 1,2-propylenedioxy, 2,3-butylenedioxy, phenylenedioxy, 4,5-dimethylphenylenedioxy, 1,2-naphthalenedioxy, 2,3-naphthalenedioxy, and the like. In all instances, the carbon chain length for each of the designated radicals is shown by the designation $C_{x-y}$, which for example is meant to indicate a radical group having the indicated range of carbon atoms.

It is understood that the compounds of formula I and the products of formulae II and IV may be in the racemic or in optically active form since these compounds all have at least one center of chirality.

The end products of the instant process of formula II or formula IV are known compounds which are shown in the aforesaid U.S. Pat. application Ser. No. 261,853, to be useful as intermediates in the total synthesis of medicinally valuable steroid compounds.

The process of the present invention can be more readily understood by reference to the following Examples.

EXAMPLE 1

9β-Methyl-1-vinyl-3,4,5,6,7,8,9,10-octahydronaphthalen-6-one

A solution of 10 g (0.048 mole) of ketol 1β-hydroxy-9β-methyl-1-vinyl-perhydronaphthalen-6-one in 400 ml of benzene and 100 ml of tetrahydrofuran was stirred at room temperature while 8 ml (0.0648 mole) of boron trifluoride etherate (redistilled from calcium hydride) was added in one portion. The resulting solution was stirred and heated at gentle reflux in an 85°–90° oil bath for 16.5 hr. At the end of this time, the reaction mixture was cooled in an ice bath and poured into a mixture of 100 ml of 10% aqueous sodium hydroxide solution and ice. The organic layer was separated and dried then concentrated in vacuo yielding 11.7 g of crude product as a yellow oil. Analysis by tlc showed essentially one spot (uv) corresponding to the diene with several very minor impurities. The starting ketol could not be detected. This material was dissolved in a small amount of benzene and placed on a column of 400 g of grade II, neutral aluminum oxide (packed in benzene). The column was washed with 4-800 ml fractions of benzene which furnished after concentration in vacuo 7.86 g (86.3%) of 9β-methyl-1-vinyl-3,4,5,6,7,8,9,10-octahydronaphthalen-6-one as a colorless oil. This material crystallized rapidly. Tlc analysis showed essentially a single uv spot but a slightly more mobile impurity was detectable. Diene from another run carried out in a similar manner showed the following spectral properties: ir max ($CHCl_3$) 1710 (cyclohexanone C=O), 920, 985 cm$^{-1}$ (vinyl) -no OH; uv max (EtOH) 230 nm ($\epsilon$ 7375). The starting material and product of this Example had the 9,10-trans configuration and were racemic.

EXAMPLE 2

(+)9,10-Trans-9β-methyl-1-vinyl-3,4,5,6,7,8,9,10-octahydronaphthalen-6-one

A solution of 1.6 g (0.00768 mole) of (+)-9,10-trans-1β-hydroxy-9β-methyl-1-vinyl-perhydronaphthalen-6-one, 1.3 ml of boron trifluoride etherate, 16 ml of dry tetrahydrofuran and 64 ml of benzene were stirred and heated at reflux, under nitrogen for 18 hr. After cooling, the reaction mixture was diluted with ether and shaken with a mixture of ice and 1 N aqueous NaOH. The organic layer was separated and dried ($MgSO_4$) then filtered and concentrated in vacuo giving 1.39 g of yellow oil which crystallized. This material was dissolved in benzene and placed on a column of 75 g of grade II neutral alumina (packed in benzene). The column was then washed with 4-150 ml portions of benzene. The fractions were combined and concentrated in vacuo to give 1.197 g of colorless crystalline diene. Recrystallization of this material from hexane furnished 0.742 g of colorless crystals, m.p. 59.5°–61°; $[\alpha]_D^{25}$ +100.97° (c 0.9557, $CHCl_3$); uv max (95% EtOH) 231 nm ($\epsilon$ 7480); ir ($CHCl_3$) 1710 (Ketone C=O), 1615 (C=C), 985, 915 cm$^{-1}$ (vinyl); ms m/e 190 ($M^+$).

Anal. Calcd for $C_{13}H_{18}O$: C, 82.06; H, 9.54 Found: C, 82.14; H, 9.62

EXAMPLE 3

14β-17-Methyl-D-homoandrost-9(11),16-dien-3,15,17a-trione

A solution of 0.5 g (0.0024 mole) of 1β-hydroxy-9β-methyl-1-vinyl-perhydronaphthalen-6-one and 0.32 g (0.0024 mole) of 2,6-dimethyl-p-benzoquinone in 20 ml of benzene and 5 ml of tetrahydrofuran was stirred at room temperature while 0.4 ml of boron trifluoride etherate was added in one portion. The resulting solution was stirred and heated at reflux (80°–90° oil bath) for 19 hr during which time the color changed from yellow to brown. After cooling, the reaction mixture was diluted with ether and washed with saturated aqueous sodium bicarbonate solution then dried, filtered and concentrated in vacuo giving 0.824 g of a red, oily product. This material was seeded with authentic product and triturated with ether. The resulting solid was filtered, washed with ether and dried under high vacuum yielding 0.071 g (9.1%) of colorless solid m.p. 180°–185°.

The ether mother liquor and washes were combined and concentrated in vacuo and the oily residue (0.75 g) was chromatographed on 40 g of silica gel. Later fractions eluted with 1:1 hexane:ether were rich in product (tlc) and were combined and concentrated in vacuo giving 0.295 g of gum. Trituration with ether furnished 0.07 g of impure product, m.p. 158°–172°.

The starting material of this Example had the 9,10-trans configuration and both starting material and product were racemic.

I claim:

1. A process for the production of a compound of the formula

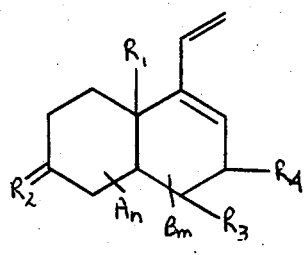

II

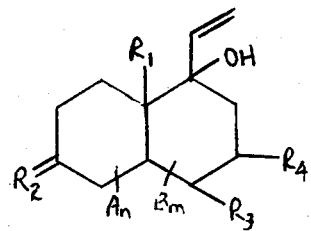

I wherein $R_1$ is $C_{1-4}$ lower alkyl; $R_2$ is oxo, $C_{1-5}$ lower alkylenedioxy, $C_{6-12}$ arylenedioxy, H,H or H,$R_5$ where $R_5$ is $C_{1-7}$ lower alkoxy, $C_{7-12}$ aryl lower alkoxy or $C_{1-12}$ acyl; $R_3$ and $R_4$ are independently selected from the group consisting of hydrogen or $C_{1-7}$ lower alkyl; A is an additional carbon-carbon bond between positions 4 and 5; B is an additional carbon-carbon bond between positions 5 and 6; m and n are 0 or 1 with the proviso that if either is 1 then the other is 0, which comprises dehydrating a compound of the formula where $R_1$, $R_2$, $R_3$, $R_4$, A, B, m and n are as defined above, with borontrifluoride etherate in the liquid phase at elevated temperature.

2. The process of claim 1 wherein said process is conducted at a temperature in the range from about 60°C to reflux temperature of the reaction medium.

3. The process of claim 1 wherein said reaction is conducted in an inert organic solvent medium containing tetrahydrofuran.

4. The process of claim 1 wherein the compound of Formula I is 9,10-trans-1β-hydroxy-9β-methyl-1-vinyl-perhydronaphthalen-6-one and the product produced is 9,10-trans-9β-methyl-1-vinyl-3,4,5,6,7,8,9,10-octahydronaphthalen-6-one.

* * * * *